United States Patent Office 2,804,382
Patented Aug. 27, 1957

2,804,382

CORRECTION OF MINERAL DEFICIENCIES IN GROWING PLANTS WITH MANGANOUS OXIDE

Alexander A. Nikitin, College Park, and James K. Plummer, Atlanta, Ga., assignors to Tennessee Corporation, New York, N. Y., a corporation of New York No Drawing. Application July 27, 1953,
Serial No. 370,644

5 Claims. (Cl. 71—31)

This invention relates to the correction of mineral deficiencies, and more particularly of manganese deficiency, in plants grown in soils lacking in available manganese.

It is well known that soils deficient in certain essential minerals do not produce vigorous healthy plant growth. Manganese, for example, appears to be important in the formation of chlorophyll, and lack of available manganese manifests itself by a change of color in the leaf area between the veins from dark green to light green or yellow. For example, spinach and lettuce leaves turn pale green or yellow but with the veins remaining a darker green. In potatoes, pale green, yellow or red splotches appear between the veins and dead patches on the leaves. Tomato foliage also becomes splotched with pale green areas and dead patches, and little or no blossoming takes place. More or less similar symptoms of the disease appear in other plants. In contrast, plants having an adequate supply of manganese are healthy and vigorous, and more resistant to disease, are better able to withstand drouth and frost, and produce substantially larger crops.

Such manifestations of manganese deficiency and the adverse effect of this disease on the health of the plant are well known and are frequently encountered since manganese is not as widely distributed in the soil as elements such as iron, and also because the manganese content of the soil is often tied up in a form in which it is unavailable to the plant. For example, manganese dioxide ($MnO_2$) is rather widely distributed in the soil but too insoluble in water and soil acids (even at pH 4.4–5.0) to furnish an adequate supply of manganese to the plant. For the same reason, the addition of manganese dioxide to the soil or its use as a spray or dust fails to correct manganese deficiency. The same objections exist to the use of other oxides such as manganic oxide ($Mn_2O_3$).

On the other hand, the water-soluble manganese sulfate ($MnSO_4$) is commonly used as a source of manganese, but its use is severely restricted by a number of factors. In the first place, this and other soluble manganese salts cause injury to the plants where applied as foliar treatments, and also leach away too rapidly in rainy weather. While soluble in the soil acids, on the other hand, these salts release so much manganese in acid soils such as pH 4.5–5.0 that they may be toxic to the plant, whereas in alkaline soils they furnish no protection.

Efforts have been made to solve these problems by the preparation of improved manganese compounds not subject to the foregoing objectives, in particular by precipitating neutral, insoluble salts by means of alkalies such as sodium, potassium and ammonium hydroxides. But such precipitated salts have proved to be too insoluble to furnish an adequate supply of manganese to plants, either as fertilizers or as foliar applications, while the lime usually used to cause precipitation is incompatible with organic fungicidal and insecticidal materials. Furthermore such precipitated neutral salts tend to oxidize and to be converted into the tri- and tetravalent compounds $Mn_2O_3$ and $MnO_2$ which are so unreactive that they are of no value for correcting manganese deficiency.

The present invention relates to the use of manganous oxide (MnO) for the correction of manganese deficiencies. We have discovered not only that manganous oxide (MnO) can safely be applied to the foliage or added to the soil with rapid and greatly improved results, but also that it has other major advantages for these purposes which make it a compound of outstanding merit for the treatment of diseased conditions resulting from lack of available manganese. Although generally classed along with manganese dioxide as insoluble, field tests have shown markedly greater assimilation of manganese by the plant in the case of manganous oxide; at the same time manganous oxide causes no injury to the plant foliage when used as a foliar treatment in the form of spray or dust. Manganous oxide retains its effectiveness in treating soils of a wide range of pH, including not only acid soils but also slightly alkaline soils. Since it can be used either as a foliar treatment or in the soil and as well in practically any soil either acid, or alkaline the need of using various forms of manganese salts under different conditions is eliminated. This advantage is of special significance and importance to the grower since it removes any and all confusion heretofore as to when and where to apply the various salts heretofore used.

Field tests have shown that when used in the soil, MnO retains its effectiveness for a considerable period of time. Furthermore it is compatible with and can be used very effectively in combination with various fertilizer materials such as the usual N–P–K fertilizers, superphosphate, etc.

For foliar application, on the other hand, MnO causes no injury and remains for a long time without leaching away. Also it is entirely compatible with fungicidal and insecticidal materials, both organic and inorganic, and can be applied with them in any desired combination as a single spray or dust treatment. Apart from the efficacy of the MnO as a cure for manganese deficiency, the above properties of compatibility with fungicidal and insecticidal materials, safety to foliage, and good adherence to foliage, render MnO the most useful and economical manganese compound for general use.

The superiority of manganous oxide in respects noted above has been demonstrated by field tests comparing it with manganese dioxide and with manganese sulfate. Thus MnO and $MnO_2$ were applied to the soil of adjacent plots at the same rates, i. e., on the basis of 15 lbs. of metallic manganese per acre. Both plots were also treated with the same amounts of regular N–P–K fertilizer. Spinach, lettuce, potatoes, and tomatoes were selected for the test, these crops being known to be readily susceptible to manganese deficiency.

None of the crops grown on the plot treated with MnO showed any of the commonly recognized symptoms of manganese deficiency, the foliage of all plants showing healthy, dark green color throughout the growing season. In contrast, the plants growing on the plot treated with $MnO_2$ did not appear healthy and the foliage was light green to yellow in color. Foliage collected from plants grown on the plots receiving MnO and from those grown on plots receiving $MnO_2$ was analyzed for manganese content. The results, presented in Table I, show that plants growing on the plots treated with MnO were able to accumulate much larger amounts of manganese than those on the plots treated with $MnO_2$.

TABLE I
*Amounts of manganese assimilated from MnO and MnO$_2$*

| Crop | Mn Content in p. p. m. | |
|---|---|---|
| | MnO | MnO$_2$ |
| Spinach | 220 | 130 |
| Lettuce | 85 | 30 |
| Potatoes | 73 | 30 |
| Tomatoes | 54 | 33 |

Yields from the plants grown on the plots treated with MnO were also much higher than from the plants grown on plots treated with MnO$_2$. These data are shown in Table II:

TABLE II
*Comparative yields from adjacent plots treated with MnO and MnO$_2$*

| Crop | Yield | |
|---|---|---|
| | MnO | MnO$_2$ |
| Spinach | 110 | 75 |
| Lettuce | 125 | 69 |
| Potatoes | 265 | 130 |
| Tomatoes | 22 | 17 |

Further studies show that manganese-deficient soils treated with MnO along with magnesium and iron compounds produced still more healthy plant growth from the standpoint of dark green foliage and increased yield. MnO$_2$ applied with magnesium and iron to an adjacent plot produced little improvement in color of foliage and only a slight increase in yield. In soils of pH above 6.0, it was found highly beneficial to add from 100–200 pounds per acre of elemental sulfur. In this case, sulfur helps to reduce the soil alkalinity and thus to stimulate the assimilation of manganese by plants.

Further field tests demonstrated the advantages of MnO as compared with soluble manganese compounds for both foliage and soil treatment. Using soy beans as a test crop, MnSO$_4$ at a concentration of 4 lbs. to 30 gal. of spray produced injury to the beans, but in the case of MnO used at the same concentration on the basis of metallic manganese, no injury was evident and symptoms of manganese deficiency completely disappeared. The response of different portions of the soy bean crop to different conditions also showed that at pH 5.3 manganous oxide and manganese sulfate furnished the same amount of available manganese, but at pH 7.8 manganous oxide furnished a substantially higher amount. This result is particularly important because manganese deficiencies are commonly observed in soils of higher pH. Still further, a given amount of metallic manganese in the form of MnO weighs only about half as much as in the form of MnSO$_4$.

The performance of MnO and MnSO$_4$ was further compared when used at the same concentration of metallic manganese as a foliar treatment for young sweet corn. In plots treated with MnO, the sweet corn showed more healthy growth as compared with that treated with MnSO$_4$ which was found to be rather injurious to the foliage. Hence lime is required to render the MnSO$_4$ insoluble, but lime has been found to be highly undesirable in this case, since it renders the manganese almost completely unavailable to plants. Another objection to the use of soluble MnSO$_4$ in combination with lime is that the resulting spray residue is incompatible with organic insecticides which therefore should not be applied in the same treatment.

The amounts of MnO to be used may vary widely, depending on the degree of Mn-deficiency, the crop, the kind and the frequency of application, etc. As typical examples in the case of foliar application, 6–12 lbs. of MnO should be used per 100 gallons of spray material to be applied over an area of about one acre. For soil treatment, 12–25 lbs. MnO per acre is about right for most cases.

In summary, the advantages of MnO over manganese compounds previously suggested for the correction of manganese deficiencies can be listed as follows:

1. Plants more readily assimilate manganese from MnO than from MnO$_2$ as shown in Table I. Visible confirmation of this fact is in the complete disappearance of symptoms of manganese deficiency when MnO is used.
2. MnO markedly improves the yields of vegetaables and other crops as shown in Table II.
3. Soil tests prove that MnO is more available in alkaline soils, pH 7.8, than is the soluble MnSO$_4$.
4. Field tests prove that MnO is entirely safe for foliage treatment. This is a considerable improvement in performance as compared with MnSO$_4$ which requires lime to neutralize its acidity.
5. MnO is more economical to use than the other manganese compounds on the market, such as MnSO$_4$ and MnO$_2$.
6. MnO is compatible with insecticidal and fungicidal materials and can be used in a single spray application with these materials. This saves labor in its use as compared with MnSO$_4$ which requires lime. MnSO$_4$-lime is incompatible with organic insecticidal and fungicidal materials.

It will be understood that the invention is not restricted to the details of the foregoing description and examples, and that reference should be had to the appended claims for a definition of its limits.

What is claimed is:

1. The method of supplying manganese to plants growing in manganese-deficient soil which comprises supplying to the plant a manganese-containing nutrient composition the manganese content of which consists essentially of manganous oxide (MnO).
2. The method of supplying manganese to growing plants which comprises applying to the foliage of the growing plant a manganese-containing nutrient composition the manganese content of which consists essentially of manganous oxide (MnO).
3. The method defined in claim 2, said composition being applied to the plant in the form of an aqueous spray.
4. The method defined in claim 2, said composition being applied to the plant in the form of a dust.
5. The method of supplying manganese to plants growing in manganese-deficient soil which comprises applying to the soil a manganese-containing nutrient composition the manganese content of which consists essentially of manganous oxide (MnO).

References Cited in the file of this patent

UNITED STATES PATENTS

| 2,215,878 | Johnson | Sept. 24, 1940 |
| 2,280,451 | Riddle | Apr. 21, 1942 |
| 2,532,548 | Heide | Dec. 5, 1950 |

FOREIGN PATENTS

| 26,867 | Great Britain | of 1909 |

OTHER REFERENCES

Bibliography of the Literature on the Minor Elements, fourth ed. (1951), vol. I, pages 680, 681, 690; vol. II, page 156.

Jones, L. H. P., et al.: Science, vol. III, pages 463–64 (1950).

Relation of Manganese and Iron, Gilbert et al., Soil Science, vol. 22, 1926, pages 437–446.